United States Patent
Kajita

(10) Patent No.: US 10,903,467 B2
(45) Date of Patent: Jan. 26, 2021

(54) SEPARATOR FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventor: Atsushi Kajita, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/574,226

(22) Filed: Dec. 17, 2014

(65) Prior Publication Data

US 2015/0180003 A1 Jun. 25, 2015

(30) Foreign Application Priority Data

Dec. 24, 2013 (JP) .................................. 2013-265970
Dec. 3, 2014 (KR) ........................ 10-2014-0172259

(51) Int. Cl.
*H01M 2/16* (2006.01)
*H01M 10/052* (2010.01)
*H01M 2/14* (2006.01)
*H01M 10/0525* (2010.01)

(52) U.S. Cl.
CPC ....... *H01M 2/1686* (2013.01); *H01M 2/1646* (2013.01); *H01M 2/1653* (2013.01); *H01M 10/052* (2013.01); *H01M 2/145* (2013.01); *H01M 2/162* (2013.01); *H01M 2/166* (2013.01); *H01M 10/0525* (2013.01)

(58) Field of Classification Search
CPC ............. H01M 2/1686; H01M 2/1646; H01M 2/1653; H01M 10/052

USPC ........................................................ 429/144
See application file for complete search history.

(56) References Cited

U.S. PATENT DOCUMENTS

| 6,387,565 B1 * | 5/2002 | Aihara .............. H01M 2/1673 429/145 |
| 6,432,586 B1 | 8/2002 | Zhang |
| 8,617,645 B2 | 12/2013 | Lee et al. |
| 2007/0264577 A1 | 11/2007 | Katayama et al. |

(Continued)

FOREIGN PATENT DOCUMENTS

| EP | 1 965 454 A1 | 9/2008 |
| EP | 2 837 496 A1 | 2/2015 |

(Continued)

OTHER PUBLICATIONS

Machine Translation of JP 2013020769 originally published to Otsuka on Jan. 31, 2013.*

(Continued)

*Primary Examiner* — Matthew J Merkling
(74) *Attorney, Agent, or Firm* — Lewis Roca Rothgerber Christie LLP

(57) ABSTRACT

A separator for a rechargeable lithium battery includes a porous layer; an inorganic layer including inorganic particles and formed on at least one surface of the porous layer; and a resin layer formed on the inorganic layer, wherein the resin of the resin layer penetrates between the inorganic particles on the surface of the inorganic layer, and the inorganic layer is integrated with the resin layer. A rechargeable lithium battery including the same is also provided.

6 Claims, 2 Drawing Sheets

(56) References Cited

U.S. PATENT DOCUMENTS

| | | | | |
|---|---|---|---|---|
| 2008/0292968 | A1* | 11/2008 | Lee | H01M 2/14 429/247 |
| 2009/0067119 | A1* | 3/2009 | Katayama | H01G 9/02 361/523 |
| 2010/0015530 | A1 | 1/2010 | Katayama et al. | |
| 2011/0293976 | A1 | 12/2011 | Chiba et al. | |
| 2012/0090758 | A1 | 4/2012 | Lee et al. | |
| 2012/0251868 | A1 | 10/2012 | Shinohara et al. | |
| 2012/0270090 | A1 | 10/2012 | Shinohara et al. | |
| 2013/0316219 | A1 | 11/2013 | Ha et al. | |

FOREIGN PATENT DOCUMENTS

| | | |
|---|---|---|
| EP | 2 838 137 A1 | 2/2015 |
| EP | 2 978 046 A1 | 1/2016 |
| JP | 2007-280781 A | 10/2007 |
| JP | 2008-123988 A | 5/2008 |
| JP | 4624304 | 11/2010 |
| JP | 2011-100635 A | 5/2011 |
| JP | 2011-131470 A | 7/2011 |
| JP | 2012-48932 A | 3/2012 |
| JP | 2013-20769 A | 1/2013 |
| KR | 10-2009-0005268 | 1/2009 |
| KR | 10-2011-0063371 | 6/2011 |
| KR | 10-2011-0097714 | 8/2011 |
| KR | 10-2012-0001809 A | 1/2012 |
| KR | 10-2013-0075672 | 7/2013 |
| KR | 10-2014-0016180 | 2/2014 |
| WO | WO 2007/066768 A1 | 6/2007 |
| WO | WO 2013/154090 A1 | 10/2013 |

OTHER PUBLICATIONS

EPO Search Report dated Apr. 8, 2015, for corresponding European Patent application 14198732.1, (7 pages).

EPO Office action dated Jun. 29, 2016, for European Patent application 14198732.1, (7 pages).

EPO Office Action dated Jun. 19, 2017, for corresponding European Patent Application No. 14198732.1 (4 pages).

JPO Office Action dated Oct. 24, 2017, for corresponding Japanese Patent Application No. 2013-265970 (2 pages).

EPO Office Action dated Apr. 5, 2018, for corresponding European Patent Application No. 14198732.1 (5 pages).

EPO Third Party Observations dated Nov. 19, 2018, for corresponding European Patent Application No. 14198732.1 (6 pages).

Japanese Patent Office Action for corresponding Japanese Patent Application No. 2013-265970, dated Oct. 21, 2019, 12 pages.

Korean Office Action dated Nov. 17, 2020, for corresponding Korean Patent Application No. 10-2014-0172259 (4 pages).

* cited by examiner

SEPARATOR FOR RECHARGEABLE LITHIUM BATTERY AND RECHARGEABLE LITHIUM BATTERY INCLUDING SAME

CROSS-REFERENCE TO RELATED APPLICATIONS

This application claims priority to and the benefit of Japanese Patent application No. 2013-265970, filed in the Japanese Patent Office on Dec. 24, 2013; and Korean Patent Application No. 10-2014-0172259, filed in the Korean Intellectual Property Office on Dec. 3, 2014, the entire contents of both of which are incorporated herein by reference.

BACKGROUND

1. Field

A separator for a rechargeable lithium battery and a rechargeable lithium battery including the same are disclosed.

2. Description of the Related Art

Recently, lithium ion batteries have been widely used for their capacity and energy density due to development of the IT technology and the like, and thus, researches on improvement of the capacity and energy density have been made due to requirements of extending the continuous usage time and the like. In particular, a laminate-type lithium ion battery is more in demand for its shape flexibility and lightweight, and herein, the laminate-type lithium ion battery is manufactured by wrapping a battery device with a film obtained by laminating various resins on an aluminum metal.

However, the laminate-type battery may have a shape change, since a battery device therein is confined by an atmospheric pressure compared with a conventional battery inserted in a cylindrical or prismatic metal can. In particular, gas may be generated due to the repetitive charging and discharging, or a separator may be separated from each electrode due to the shape change of the electrode. That is, a distance between the positive and negative electrodes may be changed. As a result, intercalation and deintercalation reactions of lithium become non-uniform and thus, may significantly decrease cycle-life of a battery. In addition, the energy density may increase, and thus, the battery may become more exothermic when a short circuit and the like occur.

Accordingly, a technology of coating the separator (e.g., before attaching it to the electrodes) with a resin that can be swollen by an electrolyte solution in order to suppress the separation of the separator from each electrode, or a technology of forming an inorganic particle layer on the surface of the separator in order to improve the heat resistance of the separator has been researched. However, the technology of coating the resin on the separator may hardly improve the heat resistance of the separator, while the technology of forming the inorganic particle layer on the surface of the separator may hardly suppress the separation of the separator from each electrode.

In order to simultaneously solve these problems, a technology of mixing inorganic particles with a resin that can be swollen in an electrolyte solution to obtain a slurry and then, coating and drying the slurry on the separator has been researched. However, when the inorganic particles are utilized in an extremely small amount, sufficient heat resistance may not be obtained; while when the amount of the inorganic particles is increased, the amount of the resin is decreased under the same thickness, and thus, the shape stability is difficult to maintain.

SUMMARY

An aspect according to one embodiment of the present invention is directed toward a separator for a rechargeable lithium battery having desirable (e.g., excellent) adherence between a separator and an electrode, as well as desirable (e.g., excellent) heat resistance.

An aspect according to another embodiment of the present invention is directed toward a rechargeable lithium battery having desirable (e.g., excellent) performance due to the separator.

According to one embodiment of the present invention, a separator for a rechargeable lithium battery includes: a porous layer; an inorganic layer on at least one surface of the porous layer and including inorganic particles; and a resin layer on the inorganic layer, wherein a resin of the resin layer penetrates between the inorganic particles on a surface of the inorganic layer, and the inorganic layer is integrated with the resin layer.

The inorganic layer may be on both sides of the porous layer.

The inorganic particles may be included in an amount of about 80 volume % to about 99 volume % based on a total volume of the inorganic layer.

The inorganic particles may include a metal oxide particle. The inorganic particle may include alumina, boehmite, titania, zirconia, magnesia, zinc oxide, aluminum hydroxide, magnesium hydroxide, or a combination thereof.

The resin may include a fluorine-based polymer.

The resin layer may have a porous structure.

The separator may have a shrinkage ratio in each MD (length direction) and TD (width direction) of less than or equal to about 10% in accordance with the following Equation 1.

$$\text{Shrinkage ratio } (\%) = [(50-L)/50] \times 100 \qquad \text{Equation 1}$$

In Equation 1, L is an interval after being allowed to stand at 130° C. for 15 minutes. The interval has an original length of 50 mm.

According to another embodiment, a rechargeable lithium battery includes the separator described above.

The separator for a rechargeable lithium battery may have excellent adherence between the separator and an electrode, and excellent heat resistance.

DETAILED DESCRIPTION

Hereinafter, embodiments are described in more detail. However, these embodiments are exemplary, and this disclosure is not limited thereto.

As used herein, when specific definition is not otherwise provided, it will be understood that when an element such as a layer, film, region, or substrate is referred to as being "on" another element, it can be directly on the other element or intervening elements may also be present. Expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, a rechargeable lithium battery according to one embodiment is described referring to FIG. 1.

Figure 1:
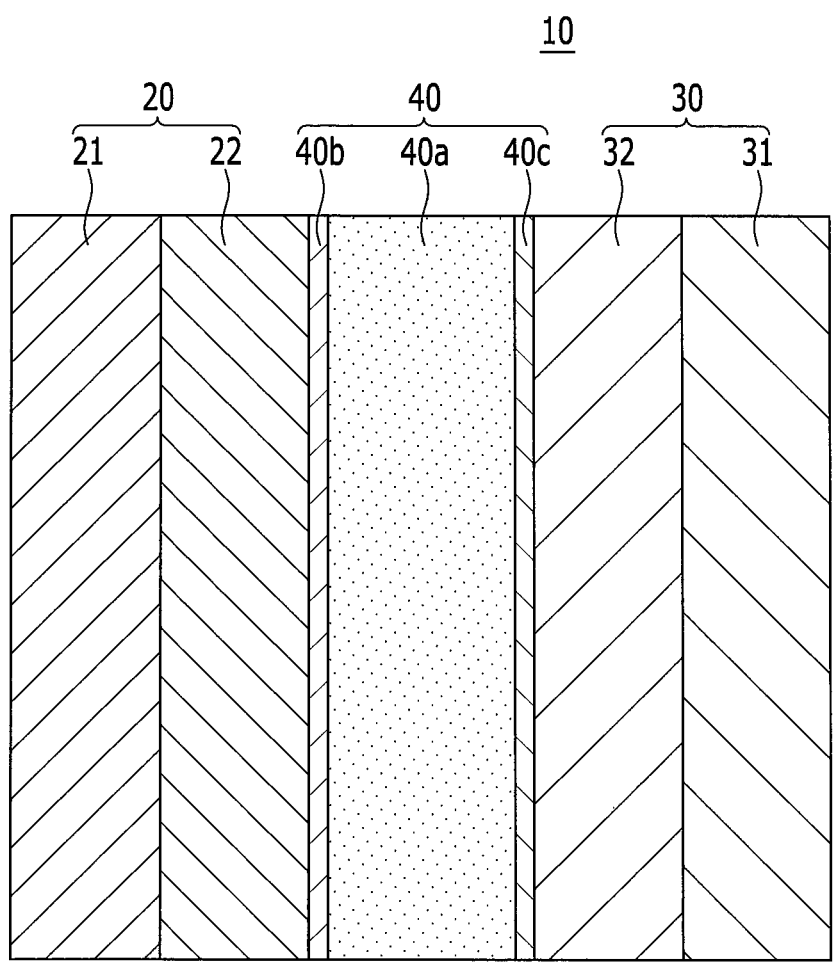
FIG. 1 is a cross-sectional view showing a schematic structure of a rechargeable lithium battery according to one embodiment.

FIG. 1 is a cross-sectional view showing a schematic structure of a rechargeable lithium battery according to one embodiment.

The rechargeable lithium battery 10 includes a positive electrode 20, a negative electrode 30, a separator 40 and a non-aqueous electrolyte. The rechargeable lithium battery 10 has a charge-reaching voltage of (an oxidation reduction potential), for example, greater than or equal to about 4.3 V (vs. Li/Li$^+$) and less than or equal to about 5.0 V, and in more embodiment, greater than or equal to about 4.5 V and less than or equal to about 5.0 V. The rechargeable lithium ion battery 10 has no particular limit to a shape, and may have any suitable shape such as in the shape of a cylinder, a prism laminate-type, a button, and/or the like.

The positive electrode 20 includes a current collector 21 and a positive active material layer 22.

The current collector 21 may be any suitable conductor, and may include, for example, aluminum, stainless steel and/or nickel plated steel.

The positive active material layer 22 includes at least a positive active material, and may further include a conductive agent and/or a binder.

The positive active material may be, for example, a lithium-containing solid solution oxide, but may be any suitable material that electrochemically intercalates and deintercalates lithium ions without limitation. The solid solution oxide may be, for example, $Li_aMn_xCo_yNi_zO_2$ ($1.150 \leq a \leq 1.430$, $0.45 \leq x \leq 0.6$, $0.10 \leq y \leq 0.15$, $0.20 \leq z \leq 0.28$), $LiMn_xCo_yNi_zO_2$ ($0.3 \leq x \leq 0.85$, $0.10 \leq y \leq 0.3$), $LiMn_{1.5}Ni_{0.5}O_4$, and/or the like.

The conductive agent may be, for example, carbon black, such as ketjen black, acetylene black, and/or the like; natural graphite; artificial graphite; and/or the like, but may be any suitable one in order to improve the conductivity of a positive electrode without limitation.

The binder may be, for example, polyvinylidene fluoride, an ethylene-propylene-diene terpolymer, a styrene-butadiene rubber, an acrylonitrile-butadiene rubber, a fluorine rubber, polyvinylacetate, polymethylmethacrylate, polyethylene, cellulose nitrate, and/or the like. But it may not be particularly limited as long as it binds the positive active material and the conductive agent on the current collector 21.

The positive active material layer 22 is manufactured, for example, utilizing the following method.

A positive electrode active mass is manufactured by dry-mixing the positive active material, the conductive agent and the binder. Subsequently, the positive electrode active mass is dispersed in an appropriate organic solvent to form a positive electrode active mass slurry, and the positive electrode active mass slurry is coated on a current collector 21, dried and compressed to form a positive active material layer 22. The organic solvent may be N-methyl pyrrolidone and/or the like. The coating method is not particularly limited, and the positive electrode active mass slurry may be coated, for example, by utilizing a knife coater, a gravure coater, and/or the like.

The negative electrode 30 includes a current collector 31 and a negative active material layer 32.

The current collector 31 may be any suitable conductor, and may include, for example, aluminum, stainless steel and/or nickel plated steel.

The negative active material layer 32 may be any suitable negative active material layer of a rechargeable lithium battery, but is not particularly limited. For example, the negative active material layer 32 may include a negative active material, and may further include a binder.

The negative active material may include at least one of a carbon-based material, a silicon-based material, a tin-based material, a lithium metal oxide, and the like. The carbon-based material may be, for example, a graphite-based material such as artificial graphite, natural graphite, a mixture of artificial graphite and natural graphite, natural graphite coated with artificial graphite, and/or the like. The silicon-based material may be, for example, silicon, silicon oxide, a silicon-containing alloy, a mixture of a graphite-based material and any of the foregoing materials, and/or the like. The silicon oxide may be represented by $SiO_x$ ($0.5 \leq x \leq 1.5$). The silicon-containing alloy is an alloy including silicon in the highest amount among all the metal elements based on the total amount of the alloy, for example, a Si—Al—Fe alloy and/or the like. The tin-based material may be, for example, tin, a tin oxide, a tin-containing alloy, a mixture of a graphite-based material and any of the foregoing tin-based materials, and/or the like. The lithium metal oxide may be, for example, a titanium oxide-based compound such as $Li_4Ti_5O_{12}$.

The binder may be the same or substantially the same as the binder of the positive active material layer 22.

The negative active material and the binder have no particularly limited weight ratio but may be mixed in a suitable weight ratio utilized in a conventional rechargeable lithium battery.

The negative active material layer 32 is manufactured, for example, utilizing the following method.

A negative electrode active mass is manufactured by dry-mixing the negative active material, and the binder. Subsequently, the negative electrode active mass is dispersed in an appropriate organic solvent to form a negative electrode active mass slurry, and the negative eleltrode active mass slurry is coated on a current collector 31, dried and compressed to form a negative active material layer 32. The solvent may be N-methyl pyrrolidone, water, and/or the like.

The separator 40 may include a porous layer 40a and a surface-treatment layer formed on at least one side of the porous layer 40a. In one embodiment, the surface-treatment layer may include a first surface-treatment layer 40b formed on one side of the porous layer 40a and a second surface-treatment layer 40c formed on the other side of the porous layer 40a.

The porous layer is not particularly limited but may include any suitable porous layer utilized in a rechargeable lithium battery. The porous layer may include a non-woven or a porous layer having desirable (e.g., excellent) high-rate discharge performance, and/or the like, which may be utilized as a single layer or a combination of multiple layers thereof.

The resin of the porous layer may be, for example, a polyolefin-based resin, a polyester-based resin, polyvinylidene fluoride (PVDF), a vinylidenefluoride-hexafluoropropylene copolymer, a vinylidenefluoride-perfluorovinylether copolymer, a vinylidenefluoride-tetrafluoroethylene copolymer, a vinylidenefluoride-trifluoroethylene copolymer, a vinylidenefluoride-fluoroethylene copolymer, a vinylidenefluoride-hexafluoroacetone copolymer, a vinylidenefluoride-ethylene copolymer, a vinylidenefluoride-propylene copolymer, a vinylidenefluoride-trifluoropropylene copolymer, a vinylidenefluoride-tetrafluoroethylene-hexafluoropropylene copolymer, a vinylidenefluoride-ethylene-tetrafluoroethylene copolymer, and/or the like. The polyolefin-based resin may be, for example, polyethylene, polypropylene, and/or the like; and the polyester-based resin may be, for example, polyethylene terephthalate, polybutylene terephthalate, and/or the like.

Figure 2:
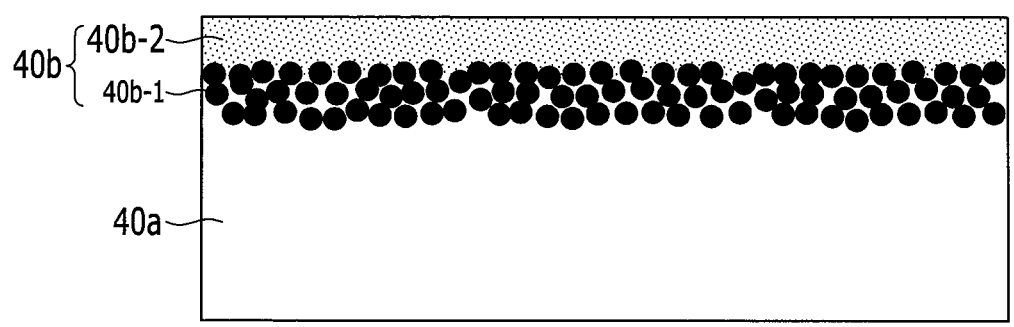
FIG. 2 is a cross-sectional view showing a schematic structure of a surface-treatment layer of a separator according to one embodiment.

FIG. 2 is a cross-sectional view showing a schematic structure of a surface-treatment layer of a separator according to one embodiment.

Referring to FIG. 2, the first surface-treatment layer 40b includes an inorganic layer 40b-1 and a resin layer 40b-2 formed on the surface of the inorganic layer 40b-1.

The inorganic layer 40b-1 provides the separator with heat resistance, and may be formed on the surface of the porous layer 40a, for example, on both sides of the porous layer 40a. The inorganic layer 40b-1 may include a plurality of inorganic particles and a binder. The inorganic particles are not particularly limited as long as they improve the heat resistance of a rechargeable lithium battery. The inorganic particles may be, in one embodiment, ceramic particles, and may be, for example, metal oxide particles. The metal oxide particles may include alumina, boehmite, titania, zirconia, magnesia, zinc oxide, aluminum hydroxide, magnesium hydroxide, and/or a combination thereof, and may be, for example, alumina, boehmite, and/or a combination thereof.

The binder is not particularly limited, and may be any suitable binder that has been utilized as a binder in a rechargeable lithium battery. The resin of the binder may be, for example, a polyolefin resin, or carboxylmethyl cellulose or a salt thereof.

The inorganic particles may be included in an amount of about 80 volume % to about 99 volume %, and in one embodiment, about 85 volume % to about 96 volume %, based on the total volume of the inorganic layer. When the inorganic particles are included within the above ranges, heat resistance of the separator may be improved.

The resin layer 40b-2 plays a role of reinforcing a binding force between the separator 40 and the positive electrode 20, and may be formed on the surface of the inorganic layer 40b-1. The resin layer 40b-2 may include a resin, and the resin may be those utilized as a binder in a rechargeable lithium battery. The resin may include, for example, a fluorine-based polymer. The fluorine-based polymer may further reinforce the binding force between the separator 40 and the positive electrode 20. Examples of the fluorine-based polymer may be polyvinylidene fluoride, a vinylidenefluoride-hexafluoropropylene copolymer, and the like.

The resin layer 40b-2 may have a porous structure, and a non-aqueous electrolyte may be impregnated in the porous structure.

The resin layer 40b-2 may be integrated with the inorganic layer 40b-1. In one embodiment, the resin included in the resin layer 40b-2 may penetrate between (or among) the inorganic particles on the surface of the inorganic layer. Accordingly, the resin layer 40b-2 may be firmly bonded with the inorganic layer 40b-1.

The separator 40 is manufactured, for example, utilizing the following method.

An inorganic layer 40b-1 is formed on the surface of the porous layer 40 by coating a coating solution including inorganic particles and a binder on the surface of the porous layer 40a and drying it. Subsequently, on the surface of the inorganic layer 40b-1, a coating layer is formed by coating another coating solution in which a resin is dissolved. Herein, the coating layer is a liquid and thus, may penetrate (e.g., deeply) between (or among) the inorganic particles.

The coating layer is then exposed to a liquid in which the resin is not dissolved, for example, water. For example, the coating layer and the porous layer 40a having the inorganic layer 40b-1 on the surface may be dipped in a water bath, or water mist may be sprayed thereon. Accordingly, a solvent in the coating layer is substituted with water, and the resin may be precipitated as a porous structure. In addition, the coating layer has already penetrated (e.g., deeply) between (or among) the inorganic particles, and thus, the resin as a porous structure may penetrate (e.g., deeply) between (or among) the inorganic particles. Accordingly, a resin layer 40b-2 combined with the inorganic layer 40a-1 as one body and simultaneously, having a pore may be formed.

The second surface-treatment layer 40c may have the same constitution as the first surface-treatment layer 40b and will not be repetitively illustrated in detail. However, the above inorganic layer may not be formed in the second surface-treatment layer 40c. In other words, the inorganic layer and the resin layer combined with the inorganic layer as one body are formed on one side of the porous layer 40a, while only the resin layer is formed on the other side of the porous layer 40a. Herein, a binding force between the surface of the porous layer 40a having no inorganic layer and an electrode may be secured.

In addition, either the first surface-treatment layer 40b or the second surface-treatment layer 40c may be omitted.

The separator may have a shrinkage ratio in each MD (length direction) and TD (width direction) of less than or equal to about 10% in accordance with the following Equation 1.

$$\text{Shrinkage ratio (\%)} = [(50-L)/50] \times 100 \qquad \text{Equation 1}$$

In the Equation 1, L is an interval between two marks on a sample after being allowed to stand at 130° C. for 15 minutes. The two marks are 50 mm apart before the sample was exposed to 130° C. for 15 minutes.

The non-aqueous electrolyte may include any suitable non-aqueous electrolyte usable for a conventional rechargeable lithium battery without a particular limit.

The non-aqueous electrolyte has a composition that an electrolytic salt is contained in a non-aqueous solvent.

The non-aqueous solvent may be, for example, cyclic carbonate esters such as propylene carbonate, ethylene carbonate, butylene carbonate, chloroethylene carbonate, vinylene carbonate, and/or the like; linear carbonates such as dimethyl carbonate, diethyl carbonate, ethylmethyl carbonate, and/or the like; cyclic esters such as γ-butyrolactone, γ-valerolactone, and/or the like; linear esters such as methyl formate, methyl acetate, butyric acid methyl, and/or the like; tetrahydrofuran or a derivative thereof; ethers such as 1,3-dioxane, 1,4-dioxane, 1,2-dimethoxy ethane, 1,4-dibutoxyethane, methyl diglyme, and/or the like; nitriles such as acetonitrile, benzonitrile, and/or the like; dioxolane or a derivative thereof; ethylene sulfide, sulfolane, sultone or a derivative thereof, which may be utilized singularly or as a mixture of two or more, without limitation.

The electrolytic salt may be, for example, an inorganic ion salt including lithium (Li), sodium (Na) or potassium (K), such as $LiClO_4$, $LiBF_4$, $LiAsF_6$, $LiPF_6$, $LiPF_{6-x}(CnF_{2n+1})_x$ (1<x<6, n=1 or 2), LiSCN, LiBr, LiI, $Li_2SO_4$, $Li_2B_{10}Cl_{10}$, $NaClO_4$, NaI, NaSCN, NaBr, $KClO_4$, KSCN, and/or the like; an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, stearyl sulfate, lithium octyl sulfate, lithium dodecylbenzene sulphonate, and/or the like, which may be utilized singularly or as a mixture of two or more.

A concentration of the electrolytic salt is not particularly limited, and may be, for example, about 0.8 mol/L to about 1.5 mol/L.

The non-aqueous electrolyte may include various suitable additives. The additives may be an additive functioning for a negative electrode, an additive functioning for a positive electrode, an ester-based additive, a carbonate ester-based additive, a sulfate ester-based additive, a phosphateester-based additive, a borate ester-based additive, an acid anhydride-based additive, an electrolyte-based additive, and/or the like. Among them, at least one or at least two may be added to the non-aqueous electrolyte.

Hereinafter, a method of manufacturing a rechargeable lithium battery is described.

The separator 40 is disposed between the positive electrode 20 and the negative electrode 30 to manufacture an electrode structure, the electrode structure is processed into a desired shape, for example, cylindrical, prismatic, laminate, or button shape, and the resultant is inserted into a case with the desired shape. Subsequently, the non-aqueous electrolyte is injected into the shaped case, and the electrolyte solution is impregnated into each pore of the separator to manufacture a rechargeable lithium battery.

Hereinafter, the embodiments are illustrated in more detail with reference to the following examples. However, what is not described in this disclosure may be sufficiently understood by those who have knowledge in this field and will not be illustrated here.

Manufacture of Separator

Example 1

An inorganic layer coating solution was prepared by mixing 94 wt % of alumina (sumicorundum AA03, SUMITOMO Chemical Co., Ltd.) as the inorganic particles, 5 wt % of a polyethylene aqueous dispersion (chemipearl S100, Mitsui Chemical Inc.) as a binder, and 1 wt % of carboxylmethyl cellulose (CMC) (2200, DAICEL Chemical Ind., Ltd.), adding ion exchange water to the mixture, and dispersing the obtained mixture with an ultrasonic wave disperser. Herein, a solid content was included in an amount of 20 wt % based on the total weight of the inorganic layer coating solution.

A resin layer coating solution was prepared by adding polyvinylidene fluoride (KF9300, Kureha Inc.) as a resin to an N-methylpyrrolidone solvent, and agitating the mixture to completely dissolve the resin. Herein, the resin layer coating solution includes the resin in a concentration of 5 wt % based on the total amount of the resin layer coating solution.

Subsequently, the inorganic layer coating solution was coated on one side of a 7 μm-thick polyethylene porous layer (E07BLS, Toray BSF Co., Ltd.) with a gravure coater and dried to form an inorganic layer. The inorganic layer had a thickness of 9 μm after the drying. Herein, the inorganic layer includes the inorganic particles in an amount of 90 volume % based on the total volume of the inorganic layer including the inorganic particles and the binder.

Then, the resin layer coating solution was coated on both sides of the polyethylene porous layer having the inorganic layer thereon with a dip coater, and then, solidified in a water bath and dried, forming a resin layer.

Accordingly, a surface-treated layer including the inorganic layer and the resin layer was formed on one side of the porous layer, while the resin layer was formed on the other side of the porous layer, thus completing the manufacturing of a separator. Herein, the separator had a total thickness of 12 μm after drying the resin layer.

Example 2

A separator was manufactured according to the same method as Example 1 except for changing the amount of the inorganic particles in the inorganic layer into 80 volume % based on the total volume of the inorganic particles and the binder.

Example 3

A separator was manufactured according to the same method as Example 1 except for utilizing boehmite as the inorganic particles instead of the alumina.

Example 4

A separator was manufactured according to the same method as Example 1 except for forming the resin layer utilizing the following method.

The resin layer was formed by coating the resin layer coating solution on both sides of the polyethylene porous layer having the inorganic layer on one surface with a dip coater, contacting it with water mist generated by an ultrasonic wave on the coated sides and drying it. Herein, after drying the resin layer, the separator had a total thickness of 12 μm.

Example 5

A separator was manufactured according to the same method as Example 1 by coating the inorganic layer coating solution on both sides of a 7 μm-thick polyethylene porous layer to form an inorganic layer on each side, and then, coating the resin layer coating solution on each of the inorganic layers to form a resin layer on each side.

Accordingly, a separator having a surface-treatment layer including the inorganic layer and the resin layer on both sides of the porous layer was manufactured. Herein, the separator had a total thickness of 10 μm, after drying the resin layer.

Comparative Example 1

A separator was manufactured according to the same method as Example 1 except for forming the resin layer as follows.

The resin layer was formed by coating the resin layer coating solution on both sides of a polyethylene porous layer having the inorganic layer thereon with a dip coater and drying it. Herein, the separator had a total thickness of 11 μm after drying the resin layer.

The resin layer was neither combined with the inorganic layer as one body nor had a pore.

(Manufacture of Rechargeable Lithium Battery Cell)

96 wt % of a solid solution oxide $(Li_{1.20}Mn_{0.55}Co_{0.10}Ni_{0.15}O_2)$, 2 wt % of ketjen black and 2 wt % of polyvinylidene fluoride (PVDF) were dispersed into an N-methylpyrrolidone solvent, thus preparing a positive electrode active mass slurry. Subsequently, the positive electrode active mass slurry was uniformly coated on an aluminum foil, dried by a blowing drier set at 80° C. for 15 minutes, and compressed with the aluminum foil. Subsequently, the coating layer was vacuum-dried at 100° C. for 6 hours. Accordingly, a positive active material layer was formed on the aluminum foil, thus completing the manufacturing of a positive electrode. The positive active material layer had a charge density of 3.0 g/cm$^3$.

On the other hand, a negative electrode active mass was prepared by mixing artificial graphite (MAG, HITACHI, Ltd.), carboxylmethyl cellulose sodium and a styrene-butadiene rubber in a weight ratio of 97.5:1:1.5. Subsequently, the negative electrode active mass was dispersed into water as a solvent, thus obtaining a negative electrode active mass slurry. Then, the negative electrode active mass slurry was coated on an 8 μm-thick copper foil as a current collector. Then, the coating layer was compressed with the copper foil to form a negative active material layer on the current collector, thus completing the manufacturing of a negative electrode. The negative active material layer on the current collector had a charge density of 1.60 g/cm$^3$.

The positive and negative electrodes and each separator according to Examples 1 to 5 and Comparative Example 1 were utilized to manufacture a 25 mm-wide laminate cell. Herein, a non-aqueous electrolyte obtained by utilizing 1.5 M LiPF$_6$ and a mixed solvent of ethylene carbonate, diethyl carbonate and fluoroethylene carbonate (10:70:20 of a volume ratio) was injected into the laminate cell, the laminate cell was sealed under a reduced pressure to manufacture a test laminate cell, and the test laminate cell was inserted in a heat presser at 85° C. for 60 seconds, thus obtaining a sample.

Evaluation 1: Structure Examination of Separator

A mending tape was respectively adhered to the separators according to Examples 1 to 5 and Comparative Example 1 and then, peeled off therefrom to examine the structure of the resin layer and the inorganic layer.

As a result, as for Examples 1 to 5, the resin layer and the inorganic layer were combined as one body and peeled off from the polyethylene porous layer, while as for Comparative Example 1, only the resin layer was peeled off, but the inorganic layer remained on the polyethylene porous layer. Accordingly, the separator according to one embodiment had a unification structure (integrated structure) of a resin layer and an inorganic layer.

Evaluation 2: Thermal Shrinkage of Separator

The separators according to Examples 1 to 5 and Comparative Example 1 were respectively cut into a size of TD×MD=60 mm×80 mm and marked every 50 mm of the TD (a width direction) and MD (a length direction) by using a slide caliper. Subsequently, the separators were respectively inserted between an aluminum foil folded at a half and maintained at a 130° C. thermostat for 15 minutes. Subsequently, the separators were taken out therefrom, and their marked scales in each TD and MD were read to calculate the thermal shrinkage ratios according to the following equation 1. The results are provided in the following Table 1.

Shrinkage ratio (%)=[(50−L)/50]×100    Equation 1

In Equation 1, L is an interval between two marks after being allowed to stand at 130° C. for 15 minutes.

Evaluation 3: Load Characteristics of Rechargeable Lithium Battery Cell

The laminate cells according to Examples 1 to 5 and Comparative Example 1 were CC charged at 0.2 C up to 4.2 V and then, CV charged down to 0.05 C.

The laminate cells were discharged at 0.5 C, and their discharge capacity at this moment was measured as C1. In addition, the laminate cells were charged under the same condition and discharged at 1.0 C, and their discharge capacity at this moment was measured as C2. A maintenance ratio of the C2 relative to the C1 was defined as load characteristics, and the results are provided in the following Table 1. The load characteristics were evaluated by using TOSCAT3000 made by Toyo System Co., Ltd.

Maintenance ratio (%)=C2/C1×100

Evaluation 4: Adherence Between Separator and Electrode

The laminate cells according to Examples 1 to 5 and Comparative Example 1 were decomposed, and the separator and the electrode were separated by hands. When the separator and the electrode had adherence, an electrode active mass would be transferred to the separator. A photograph of each negative electrode was taken by a digital camera, a ratio of the negative electrode active mass remaining on a copper foil, that is, an electrode residue ratio (%) was calculated as an adherence index, and the results are provided in the following Table 1.

Evaluation 5: Outmost Surface of Separator

The outmost surface of the separators according to Examples 1 to 5 and
Comparative Example 1 was examined with a scanning electron microscope (SEM), the presence of a resin and inorganic particles was examined with naked eyes, and the results are provided in the following Table 1.

TABLE 1

|  | Inorganic particles | Amount of inorganic particles (volume %) | Coated surface of inorganic layer | Treatment after coating resin layer coating solution | Outmost surface of separator | Electrode residue ratio (%) | Shrinkage ratio (%) TD | Shrinkage ratio (%) MD | Load characteristics Maintenance ratio (%) |
|---|---|---|---|---|---|---|---|---|---|
| Example 1 | alumina | 90 | One side | Solidified in water bath | Only resin is present | 5 | 2 | 2 | 95 |
| Example 2 | alumina | 80 | One side | Solidified in water bath | Only resin is present | 5 | 5 | 6 | 95 |
| Example 3 | boehmite | 90 | One side | Solidified in water bath | Only resin is present | 6 | 2 | 2 | 95 |
| Example 4 | alumina | 90 | One side | Water mist spraying | Only resin is present | 5 | 2 | 2 | 95 |
| Example 5 | alumina | 90 | Both sides | Solidified in water bath | Only resin is present | 7 | 4 | 3 | 95 |
| Comparative Example 1 | alumina | 90 | One side | Dried as it is | Only resin is present | Evaluation is impossible | 2 | 2 | Evaluation is impossible |

In Table 1, the amount of inorganic particles (volume %) is based on the entire volume amount of an inorganic layer.

Referring to Table 1, Examples 1 to 5 including a resin layer formed by coating a resin layer coating solution and solidifying it in a water bath or by spraying water mist showed small thermal shrinkage and simultaneously, excellent load characteristics as well as excellent adherence between a separator and an electrode and thus, excellent battery performance compared with Comparative Example 1.

Accordingly, when the resin layer was formed as shown in Examples 1 to 5, a resin included in the resin layer penetrated between (or among) the inorganic particles on the surface of the inorganic layer and forms a unification structure (e.g., an integrated structure) between the inorganic layer and the resin layer as the structure of the separators was examined in Evaluation 1, and the separators having such a structure showed excellent adherence to an electrode as well as excellent heat resistance and thus, contributed to improvement of battery performance.

As for Comparative Example 1, a resin layer was not phase-separated but dried and thus, formed as a film (e.g., a non-porous film) and showed remarkably deteriorated permeability. In other words, Comparative Example 1 showed low thermal shrinkage, but the film-type (e.g., non-porous) resin layer was not impregnated with an electrolyte solution, and thus, a cell assembly was not possible. Accordingly, load characteristics and adherence could not be evaluated.

Therefore, the present invention may provide a laminate-type rechargeable lithium battery having low thermal shrinkage ratio but excellent adherence of a separator to an electrode and high shape-keeping capability but excellent safety.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A separator for a rechargeable lithium battery, comprising:
    a porous layer having a first surface and a second surface opposite to the first surface;
    an inorganic layer on the first surface of the porous layer and comprising inorganic particles and a binder comprising a binder resin, the binder resin comprising a polyolefin resin, and the inorganic particles comprises alumina, boemite or a combination thereof; and
    a first resin layer on the inorganic layer and a second resin layer directly on the second surface of the porous layer, the first and second resin layers consisting essentially of a resin,
    wherein the resin of the first resin layer penetrates between the inorganic particles on a surface of the inorganic layer, and the inorganic layer is integrated with the first resin layer, the resin of the first resin layer is different from the binder resin of the inorganic layer,
    the resin of the first and second resin layers comprises a fluorine-based polymer selected from the group consisting of polyvinylidene fluoride and vinylidenefluoride-hexafluoropropylene copolymer, the fluorine-based polymer being configured to dissolve in a solvent, and
    wherein the inorganic particles are included in an amount of 80 volume % to 90 volume % based on a total volume of the inorganic layer.

2. The separator for a rechargeable lithium battery of claim 1, wherein the resin layer has a porous structure.

3. The separator for a rechargeable lithium battery of claim 1, wherein the separator has a shrinkage ratio in each MD (length direction) and TD (width direction) of less than or equal to about 10% in accordance with the following Equation 1:

$$\text{Shrinkage ratio (\%)} = [(50-L)/50] \times 100 \qquad \text{Equation 1}$$

wherein, in Equation 1, L is an interval after being allowed to stand at 130° C. for 15 minutes, and the interval has an original length of 50 mm.

4. A rechargeable lithium battery comprising the separator of claim 1.

5. The separator for a rechargeable lithium battery of claim 1, wherein the fluorine-based polymer is configured to dissolve completely in a solvent.

6. A separator for a rechargeable lithium battery, comprising:
    a porous layer having a first surface and a second surface opposite to the first surface;
    an inorganic layer on the first surface of the porous layer and comprising inorganic particles and a binder comprising a binder resin, the binder resin comprising a polyolefin resin, or carboxymethyl cellulose, or a salt of carboxymethyl cellulose, and the inorganic particles comprises alumina, boemite or a combination thereof; and
    a first resin layer on the inorganic layer and a second resin layer directly on the second surface of the porous layer, the first and second resin layers consisting essentially of a resin,
    wherein the resin of the first resin layer penetrates between the inorganic particles on a surface of the inorganic layer, and the inorganic layer is integrated with the first resin layer, the resin of the first resin layer is different from the binder resin of the inorganic layer,
    the resin of the first and second resin layers comprises a fluorine-based polymer selected from the group consisting of polyvinylidene fluoride and vinylidenefluoride-hexafluoropropylene copolymer, the fluorine-based polymer being configured to dissolve in a solvent, and
    wherein the inorganic particles are included in an amount of 80 volume % to 90 volume % based on a total volume of the inorganic layer.

* * * * *